United States Patent
McElrea

(10) Patent No.: US 9,829,023 B2
(45) Date of Patent: Nov. 28, 2017

(54) CONNECTOR

(71) Applicant: DMOTM LIMITED, Newton, Aukland (NZ)

(72) Inventor: Daniel Peter McElrea, Aukland (NZ)

(73) Assignee: DMOTM LIMITED, Aukland (NZ)

( * ) Notice: Subject to any disclaimer, the term of this patent is extended or adjusted under 35 U.S.C. 154(b) by 0 days.

(21) Appl. No.: 14/907,179

(22) PCT Filed: Jul. 24, 2014

(86) PCT No.: PCT/IB2014/001390
§ 371 (c)(1),
(2) Date: Jan. 22, 2016

(87) PCT Pub. No.: WO2015/011555
PCT Pub. Date: Jan. 29, 2015

(65) Prior Publication Data
US 2016/0160898 A1    Jun. 9, 2016

(30) Foreign Application Priority Data
Jul. 25, 2013  (NZ) ........................ 613616

(51) Int. Cl.
*F16B 7/14*     (2006.01)
*F16B 7/04*     (2006.01)
*B63H 16/04*    (2006.01)

(52) U.S. Cl.
CPC ........... *F16B 7/1481* (2013.01); *B63H 16/04* (2013.01); *F16B 7/0413* (2013.01)

(58) Field of Classification Search
CPC ...... F16B 7/1481; F16B 7/0413; F16B 37/12; B63H 16/04; Y10T 403/32524; Y10T 403/7077
See application file for complete search history.

(56) References Cited

U.S. PATENT DOCUMENTS

| | | | | |
|---|---|---|---|---|
| 2,503,093 A | * | 4/1950 | Buchanan | F16G 11/04 174/84 S |
| 3,884,508 A | * | 5/1975 | Jones | F16L 37/0844 285/27 |
| 3,934,315 A | * | 1/1976 | Millheiser | F16L 37/025 24/453 |
| 4,640,535 A | * | 2/1987 | Hermann | F16L 37/084 285/139.3 |
| 5,366,328 A | | 11/1994 | Helderman | |
| 6,293,594 B1 | * | 9/2001 | Safarevich | A61N 1/05 174/84 R |
| 6,461,091 B2 | | 10/2002 | Herb | |
| 2009/0321703 A1 | * | 12/2009 | Rock | E04F 11/1817 256/65.12 |
| 2011/0306438 A1 | | 12/2011 | Moore | |

(Continued)

FOREIGN PATENT DOCUMENTS

NZ          551189 A       11/2007

*Primary Examiner* — Jonathan Masinick
(74) *Attorney, Agent, or Firm* — Fay Sharpe LLP

(57) ABSTRACT

A connector having a spring configured to change a dimension such as diameter or length in response to a change in a force applied to it, wherein the spring is biased in a radial or longitudinal direction towards a natural dimension. The connector including a dimension control portion configured to restrict the change in dimension in a direction away from the bias of the spring.

17 Claims, 8 Drawing Sheets

(56) References Cited

U.S. PATENT DOCUMENTS

| | | |
|---|---|---|
| 2012/0028518 A1 | 2/2012 | Steinhour |
| 2012/0225408 A1 | 9/2012 | Moore |
| 2012/0274064 A1 | 11/2012 | Moore |
| 2013/0266442 A1* | 10/2013 | Lass ...................... B63H 16/04 416/1 |

* cited by examiner

CONNECTOR

TECHNICAL FIELD

The present invention relates to a connector. In particular, the present invention relates to a connector used to attach two objects to each other.

BACKGROUND ART

Use of the present invention shall be described throughout the specification in relation to adjusting the length of the shaft of sporting implements—for example paddles used to propel watercraft such as standup paddle boards or kayaks and tool bits—for example a screwdriver bit. However, it should be appreciated that the present invention can be used in other applications in which objects—particularly those having shafts—are to be connected to each other, and the exemplary embodiments are not intended to be limiting.

In the context of standup paddle boards, the optimal length of a paddle may vary between individuals based on their physical characteristics, or paddling styles. Further, an individual may want to adjust the length of a paddle to account for changes in paddling style—whether to account for current weather conditions, fatigue levels, or the current activity (for example racing versus recreational paddling).

Numerous mechanisms have been used to provide adjustability in paddles—for example, spring pin arrangements, pressure cleats, and clamps. US Patent Application Publication No. 2012/0028518 describes a system wherein a lever on the paddle handle is used to release and activate a plug on a lower shaft portion.

However, such systems have inherent flaws—for example being visually or physically obtrusive on the exterior of the paddle shaft, mechanically complicated, or using metal parts which rust over time.

Another type of adjustment mechanism is described in New Zealand Patent No. 551189. The mechanism includes a shaft to which a helical wire spring is attached. The shaft and springs fits within an external sleeve.

In use, the spring biases against the internal surface of the external sleeve to cause a friction fit. To move the external sleeve with respect to the shaft, a tool is passed through the sleeve to connect with the spring. The spring is then twisted causing the circumference of the spring to lessen, thus disengaging the spring from the internal surface of the sleeve. This enables the sleeve to be moved with respect to the shaft. Upon release of the spring, the material memory of the spring causes it to revert to its original larger circumference and press against the sleeve.

US Patent Application Publication No. 2011/0306438 describes a connector based on a similar principle, although reversed—with the helical spring biased inwardly against the external surface of a shaft positioned within it.

While the connectors act as effective adjustment mechanisms in certain applications, there remains room for improvement. In particular, under certain load conditions the helix can misbehave when moving beyond a desired range, leading to negative effects such as failure of the friction fit allowing the shafts to slip relative to each other, shifting of the connector as the helix settles on release, or damaging the helix itself.

Additionally, its been observed that in some circumstances, the helix may expand differently along its length—leaving portions of the helix engaged while others are disengaged.

Aspects of misbehaviour may be compensated for to a degree by increasing the strength of the spring, but this can make adjustment more difficult, and the parts heavier and more costly. Further, some aspects of misbehaviour may remain uncorrected by simply changing characteristics of the spring.

It is an object of the present invention to address the foregoing problems or at least to provide the public with a useful choice.

All references, including any patents or patent applications, cited in this specification are hereby incorporated by reference. No admission is made that any reference constitutes prior art. The discussion of the reference states what their authors assert, and the applicants reserve the right to challenge the accuracy and pertinency of the cited documents. It will be clearly understood that, although a number of prior art publications are referred to herein, this reference does not constitute an admission that any of these documents forms parts of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

According to one aspect of the present invention there is provided a connector including:
  a spring configured to change its dimension (e.g. diameter or length) in response to a change in force applied to it, wherein the spring is biased in a radial or longitudinal direction towards a natural dimension; and
  a dimension control portion configured to restrict a change in dimension of the spring in at least one direction.

According to another aspect of the present invention there is provided a method of connecting an object to a connector as substantially described above, characterised by the steps of
a) applying a force to the spring, altering the diameter or length of the spring away from its natural state, wherein the dimension control portion restricts change in dimension of the spring in at least one direction;
b) moving an object along the spring while applying the force in order to position the shaft relative to the spring, and
c) releasing the force from the spring, allowing the spring to return towards its natural dimension thereby providing a friction fit between the spring and the object.

According to another aspect of the invention there is provided a connector including a mechanism for gripping an associated article having an external surface with an outer dimension, the mechanism including:
  a sleeve having an open end, the open end configured to receive the outer dimension of the article;
  a spring having at least a portion of its outer surface surrounded by the sleeve;
  the spring having an inner diameter of an at least similar dimension to the outer dimension of the article;

the spring being configured such that when a force is applied its inner diameter is greater than the outer dimension of the article so that the mechanism can move over the article; and when the force is no longer applied the spring is biased to return toward its original inner diameter and bear against the external surface of the article.

It should be appreciated that while it is envisaged that the connector of the present invention may permit variable adjustment of the position of the connector (and any object attached to the connector) and an object, such as a shaft, relative to each other, this is not intended to be limiting. The connector may be configured to provide a single locking position, or multiple locking positions at fixed points, for example through the use of varying diameters on one or more of the shafts which only create a friction fit at those points.

A spring should be understood to mean a resilient device which returns towards its original shape—particularly its natural diameter—after being twisted or pushed or pulled. In certain embodiments, the spring will have a first end anchored to a main body such as a tube and a second at least substantially free end, such that the spring can be rotated about its anchored end. Similarly, the dimension control portion, such as a sheath overlapping the spring, can have a first end anchored to the tube (as one example) and a second free end within which the spring can rotate.

Generally, the spring will be anchored by its attachment to the object being connected. Anchored will include instances where the spring is manufactured independently and subsequently joined to the object, as well as instances where the spring is formed integrally with, or cut out of the object (such as shaft).

Preferably the springs are helical springs. Helical springs have an inherent bias to their structure which causes them to return towards a natural diameter after having been adjusted away from this diameter by the application of force.

Exemplary helical forms include: 1. simple helices such as a helical cut tube end; 2. woven helices as in the Chinese finger pull, where there are more than two helices, generally woven, and in both clockwise and anticlockwise directions; 3. solid helices as in a helical form which has no central thickness and may be visualized as a full thickness structural thread, a solid helix may be visualized by the compression of a worm or auger shape to a shorter length which would create a pitch of the compressed (formerly open) helix; 4. laminated helices where two or more helical forms generally overlay, for example an outer helix winding and an outer helix winding; 5. spaced helices where two or more helices are generally coaxially but displaced axially relative to each other, relatively adjacent or remote from each other; and, 6. combinations of the above types, or where a helix may be complete or partial along the length of a part.

However, it should be appreciated that other spring types may be used with the present invention, for example a volute spring or other rolled material configurations.

Reference to the natural diameter of a spring should be understood to mean the diameter of the spring it is biased towards when released from external forces. Where the connector is to be inserted into a hollow shaft, the natural diameter should be understood to refer to the exterior diameter of the spring biased to expand outwardly after being contracted. Conversely, where the connector is to receive a shaft through the springs, the natural diameter is the interior diameter of the spring biased to contract inwardly after being expanded.

In one embodiment, the connector may include more than one spring.

For example, the connector may include both a right handed spring and a left handed spring. Reference to handedness of a spring should be understood to be defined by the expansion of the diameter of a spring when held at one end and the distal end is rotated in a particular direction.

In the context of a helical spring, this may be determined by the orientation of the helix forming the spring. Generally, a right handed spring is one that, when viewed along its axis, a clockwise screwing motion moves the helix away from the observer (and would thus expand when fixed at the distal end and turned in an anti-clockwise direction). If the helix moves towards the observer then it is a left handed spring.

It is envisaged that such an arrangement may resist accidental release of the connector due to incidental forces releasing a single spring. Due to the opposing handedness of the springs, twisting one end of the connector (or object connected to it) will only release one of the springs. In order to release both, a central position between the springs must be engaged and twisted.

One potential issue with such an arrangement without a dimension control portion is that a substantial lag in release of the springs can occur under certain conditions—with diameter of the first spring moving to its maximum before force is transferred to the second spring. By limiting the extent to which the diameter of the first spring can change, this effect may be reduced.

In another embodiment, the object to which the connector is connected may include a spring configured to bear against the connector, or the part to which the connector is attached. For example, where the connector fits over a shaft, the shaft may include a spring biased outwardly to bear against the interior of the connector.

Reference to a dimension control portion should be understood to be any means by which a change of a dimension of the spring in an undesired direction may be physically restricted.

In one embodiment, the dimension control portion is a diameter control portion configured to restrict a change in a diameter of the spring in a direction away from the bias of the spring. Reference to a diameter control portion should be understood to be any means by which the change in diameter of the spring in a direction away from the bias of the spring is physically restricted.

Further, the dimension control portion may be configured to restrict a change in length of the spring. In some circumstances, elongation or longitudinal compression of the spring can lead to misbehaviour—for example, changes in longitudinal position due to "settling" of the spring on release. By restricting the change in length of the spring, the effects of this behaviour may be reduced. Similarly, the dimension control portion could control both the length and diameter of the spring. For example, a sheath overlying both the outer surface and the free end of the spring can accomplish both dimensional controls. As an additional example, tape or a body molded over the spring can control both dimensions of the spring.

Excessive movement of the spring can lead to distortion of the spring resulting in weakening or failure. In general, only a miniscule degree of movement may be sufficient to allow release of the friction fit and subsequent adjustment—and the dimension control portion may be configured to permit only such minimal movement in order to avoid the afore mentioned negative effects.

However, it should be appreciated that the desired or allowable extent of this limitation and associated tolerance may vary between applications or materials used.

In a preferred embodiment the diameter control portion is configured to bear against a surface of the spring facing away from the direction of the bias when the diameter of the spring is altered.

It is envisaged that this arrangement may achieve the desired limitations on change in diameter without impinging on the surface area of the spring available to bear against the other shaft to create the friction fit.

For example, where the spring is configured to fit over the shaft to which it is to be connected, the diameter control portion may be a sleeve extending over at least a portion of the outer surface of the spring.

In doing so, a number of additional effects may be achieved. For example, the sleeve may prevent an operator of the connector from contacting the spring directly—whether to avoid misuse of the spring, or for health and safety purposes by preventing the operator pinching themselves or clothing between the coils of the spring.

In some cases, the application of force to the spring can cause the diameter of the spring to change at one point rather than along its entire length, leading to the undesirable ballooning of the spring at that point. The sleeve can contain this, distributing the force along the length of the spring as it expands to bear against it.

Further, the sleeve may reduce the likelihood of foreign material entering the gap between coils of the spring.

Additionally, the sleeve may provide a continuous surface for applying markings to the container—for example branding, or guidance for use—which may otherwise be difficult to apply to the spring.

It should be appreciated that the sleeve may also be used to restrict changes in length of the spring. For example, the sleeve may be made of a material which allows a limited degree of compression and/or elongation. Such a sleeve may be secured at either end of the spring or potentially at points along the length of the spring. In doing so, the sleeve may restrict expansion of the spring both radially and longitudinally.

It should be appreciated that the sleeve need not be continuous about the circumference of the spring, although this may be useful for achieving a desired degree of resistance against expansion of the spring. Further, it should be appreciated that the dimension control portion may extend along part, or all, of the spring.

It is envisaged that the embodiment in which the dimension control portion is a sleeve may be particularly suited to use in the handle of a sporting implement—for example a paddle for a stand up paddle board. The sleeve covers these gaps, providing a surface for a more ergonomic grip. Similarly, the sleeve can provide the gripping surface for application of a force upon the spring to allow adjustment of the paddle shaft elements. More particularly, in an exemplary embodiment where the sleeve is gripped and an inserted shaft rotated, the spring is rotated such that its internal diameter is increased and the inserted shaft can be slideably moved inwardly (shortening the paddle, as one example) or slideably moved outwardly (lengthening the paddle, as one example). When the sleeve is released from the gripping the spring returns toward its natural state and engages the inserted shaft.

The sleeve may also be used to seal the interior of the paddle and prevent water or other foreign material entering between the coils in the spring which would otherwise affect the weight and balance of the paddle, and potentially affect operation of the mechanism.

In another embodiment, the connector is adapted for use as a tool bit, particularly a fastener driving bit. For example, the connector may be a screwdriver bit to be driven by a drill, with the spring engaging and driving rounded screw head shapes such as cylinders or balls. It should be appreciated that reference to the fasteners being screws is not limiting as application to other fastener types or components is envisioned, for example, nuts and/or bolts.

Such screw head shapes may be particularly useful where it is desirable to resist tampering after installation. It is envisaged that the spring may be capable of gripping these screw head shapes which would otherwise require a pinching tool (such as pliers) unsuitable for adaption for use as a bit.

This effect may be emphasised by tapering the screw heads and spring, presenting a sloping edge once installed.

In use, the spring may extend from one end of the shaft, with the other end of the shaft adapted to be secured to a tool—for example a shank to be held by a chuck.

Where the interior of the spring is to engage the exterior of the screw head, a sheath may extend over the spring, finishing at the open end of the spring. In use, the open end of the spring may be pushed over the screw head—the sheath restricting the extent to which the spring can expand. Rotating the bit in one direction causes the spring to tighten on the screw head, in turn driving the screw.

In another embodiment, the exterior of the spring may be intended to engage a recess within the screw head, and the bit may include a central shaft on the interior of the spring to restrict movement inwardly. In some embodiments the bit may also include a partial exterior sheath.

In the context of high speed applications (such as driving a screw) it is envisaged that the sheath may be particularly useful for safety reasons—preventing access to the spring, and also containing any shrapnel created by failure of the spring under high forces.

According to another aspect of the present invention there is provided a tool bit, including:
  a shanking end for securing the bit to a tool;
  an active end for driving a fastener, including a spring configured to change its diameter in response to a change in force applied to it; and
  a dimension control portion configured to restrict a change in dimension of the spring in at least one direction.

In one embodiment the dimension control portion includes at least one seal configured to prevent ingress or egress of foreign material, particularly fluid, through the gaps in the spring. For example, the seal may include an O-ring positioned between the dimension control portion and the connector.

It should be appreciated that while the seal may be a separate part in some embodiments, in others the seal may be achieved by friction fit between the dimension control portion and the connector.

In an embodiment where the spring is to be received within a hollow shaft, the dimension control portion may be a central shaft positioned in the middle of the spring, effectively operating in reverse to the sleeved embodiment.

In a preferred embodiment the spring and dimension control portion are made in a single piece. It is envisaged that this may assist in enhancing the strength of the mechanism by removing mechanical connections which could otherwise present points of weakness. This may also assist in ease of assembly.

For example, the sleeve or central shaft may extend from a wall of the shaft and along the spring.

However, in other embodiments the dimension control portion may be manufactured separately to the remainder of the connector. The separate diameter control portion may be secured relative to the spring using any suitable means—whether adhered, welded, or fastened.

It should be appreciated that the dimension control portion may be made of any material suitable for resisting the change in dimension of the springs according to the connector's intended application. Further, the control portion may include more than one material in one or more layers to achieve the desired operational characteristics.

In some embodiments it may be preferable for the diameter control portion to be rigid in order to provide a low tolerance limitation on the spring, and act as a housing.

However, this is not intended to be limiting. In other embodiments, flexibility may be preferable, particularly where the dimension control portion is to be used for restricting longitudinal movement.

Preferably at least the spring is made of a material having a balance of stiffness and elasticity. For example, the springs may be made of fibre-reinforced nylon, carbon fibre, ABS plastic, a polycarbonate, or titanium. It should be appreciated that these examples are not intended to be limiting and that other suitable materials known to a person skilled in the art may be used for the present invention.

It is envisaged that the present invention may enable the use of lighter materials such a carbon fibre which would otherwise be susceptible to ballooning of the helix when the spring is subjected to external forces. This may assist in integrating the connector system into implements, such as paddles, which commonly use such materials in order to achieve desired performance characteristics—particularly weight.

In another embodiment, the dimension control portion includes resilient material between gaps in the spring—for example, between coils of a helical spring.

Where the spring is configured to fit over the shaft to which it is to be connected, it is envisaged that the resilient material may permit a degree of separation (and thus radial and/or longitudinal expansion) of the spring. However, the resilient material may limit this separation—reducing the likelihood of a large gap being created between the spring and shaft which could lead to these components slipping relative to each other in use.

In this embodiment, the resilient material in the gaps may also make gripping and adjustment more comfortable—reducing the potential for the user's hands to be pinched by the spring.

Conversely, where the spring is configured to be received by a hollow shaft, the resilient material may limit compression of the spring.

It is envisaged that the resilient material may be rubber, nylon, elastomer, or any other natural or synthetic compound having the desired qualities.

It should further be appreciated that the shaft including the spring may extend beyond the springs. Further, either shaft may be attached to other objects as desired—for example a golf club handle, shaft, or head—or paddle blade or handle.

Embodiments of the present invention may provide one or more of the following advantages over the prior art:

greater effectiveness and reliability of the spring by limiting its ability to misbehave, achieved by restricting the extent to which the dimensions of the spring can be changed using the dimension control portion, increased safety through the containment preventing exposure to the spring in use, improved reliability through preventing foreign matter entering the spring and inhibiting its operation or those of the components to which it is attached, and providing a more ergonomic gripping surface by covering or filling gaps in the spring using the diameter control portion.

BRIEF DESCRIPTION OF THE DRAWINGS

Further aspects of the present invention will become apparent from the following description which is given by way of example only and with reference to the accompanying drawings in which.

BEST MODES FOR CARRYING OUT THE INVENTION

Figure 1A:
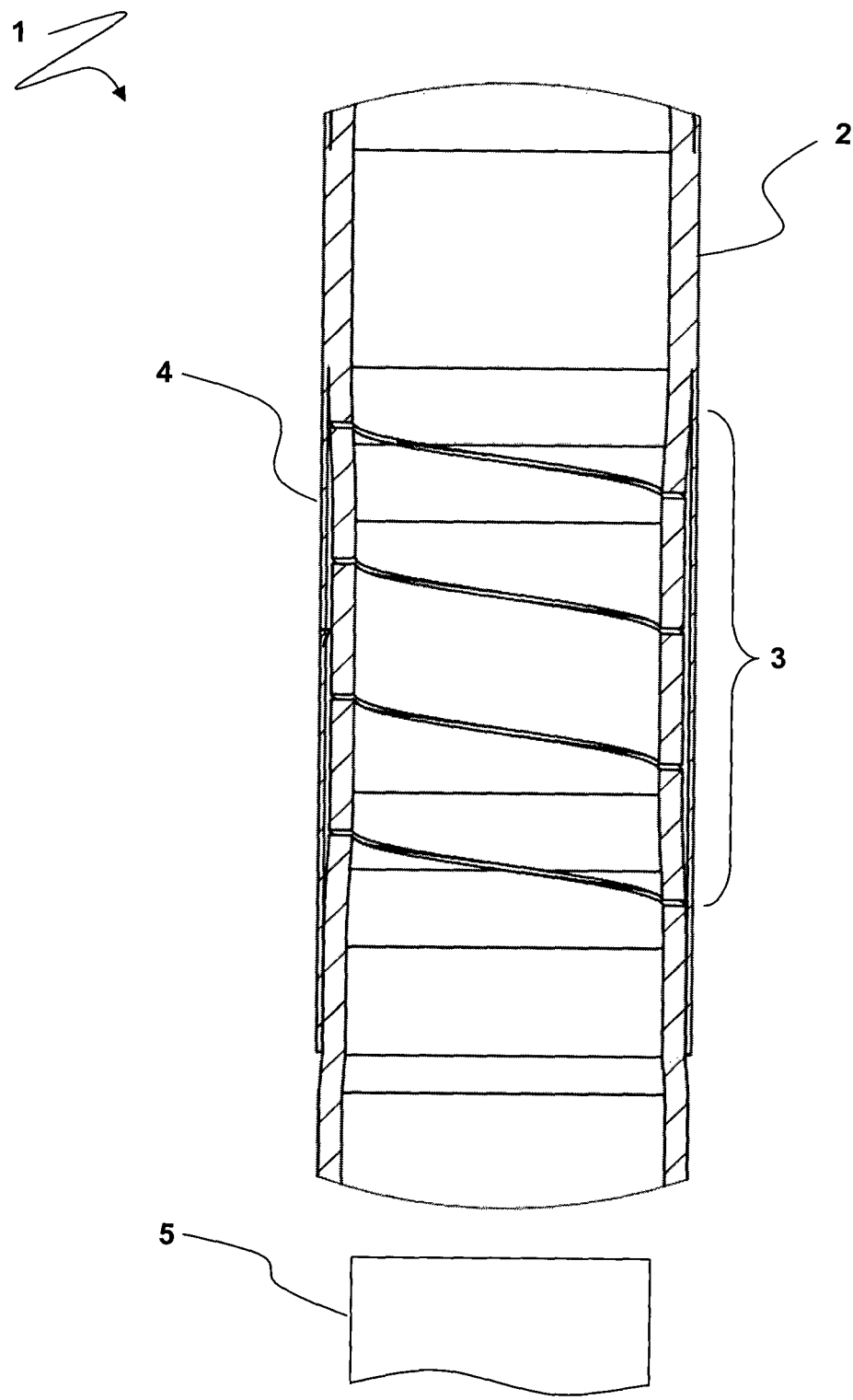
FIG. 1A-1C is a cross-sectional view of exemplary connectors in accordance with an embodiment of the present invention.

FIG. 1A shows a connector (generally indicated by arrow 1) in accordance with one embodiment of the present invention.

The connector 1 includes a hollow shaft 2. A helical slot in the hollow shaft 2 forms a spring 3. The spring 3 is contained by a substantially rigid sheath 4, which restricts the degree to which the spring 3 may expand.

In the embodiment illustrated, the sheath 4 extends from the hollow shaft 2 at one end of the spring 3, and covers the entire spring 3. Advantageously, the sheath is dimensioned only slightly larger than the spring. In that manner, minimal rotation of the spring can allow adjustment of an inserted shaft but prevent either excessive radial or longitudinal flexing of the spring.

The hollow shaft 2 receives a second shaft 5, and the hollow shaft 2 is twisted to expand the spring 3 (the expansion restricted by sheath 4) to permit the second shaft 5 to be positioned in the desired location before the spring 3 is released to bear against it.

It is further envisioned that shaft 5 could include its own spring (not shown) that could be inserted within hollow shaft 2 and interact with either an inner wall of shaft 2 or the spring 3 to provide a releasable connection. In such an embodiment, the spring of shaft 5 may or may not include a sheath 4. However, spring 3 preferably includes sheath 4.

Figure 1B:
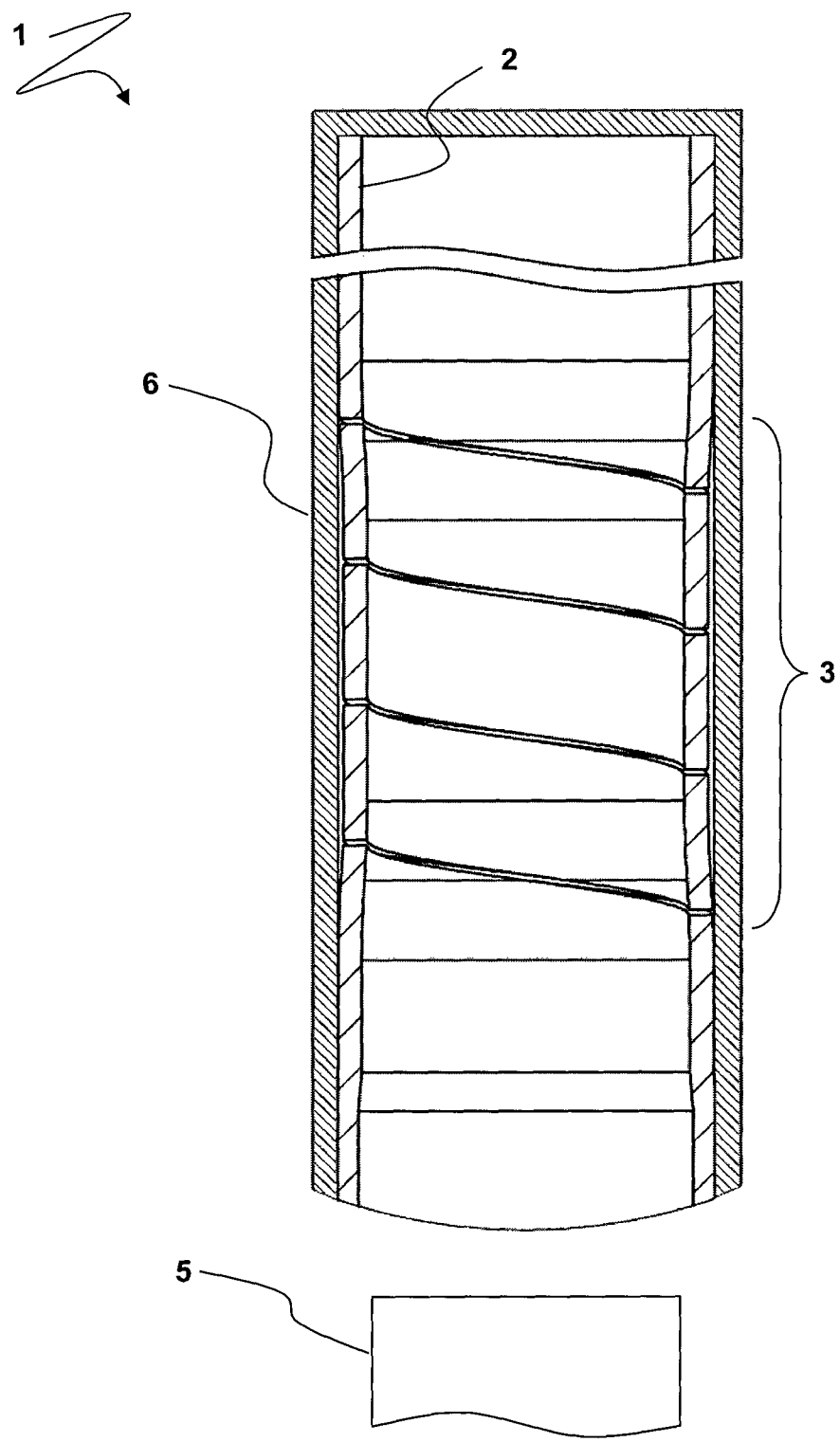

FIG. 1B illustrates an alternative embodiment, in which the integral sheath 4 of FIG. 1A is replaced with a cover 6 fitted over one end of the hollow shaft 2 and extending down over the spring 3.

Figure 1C:
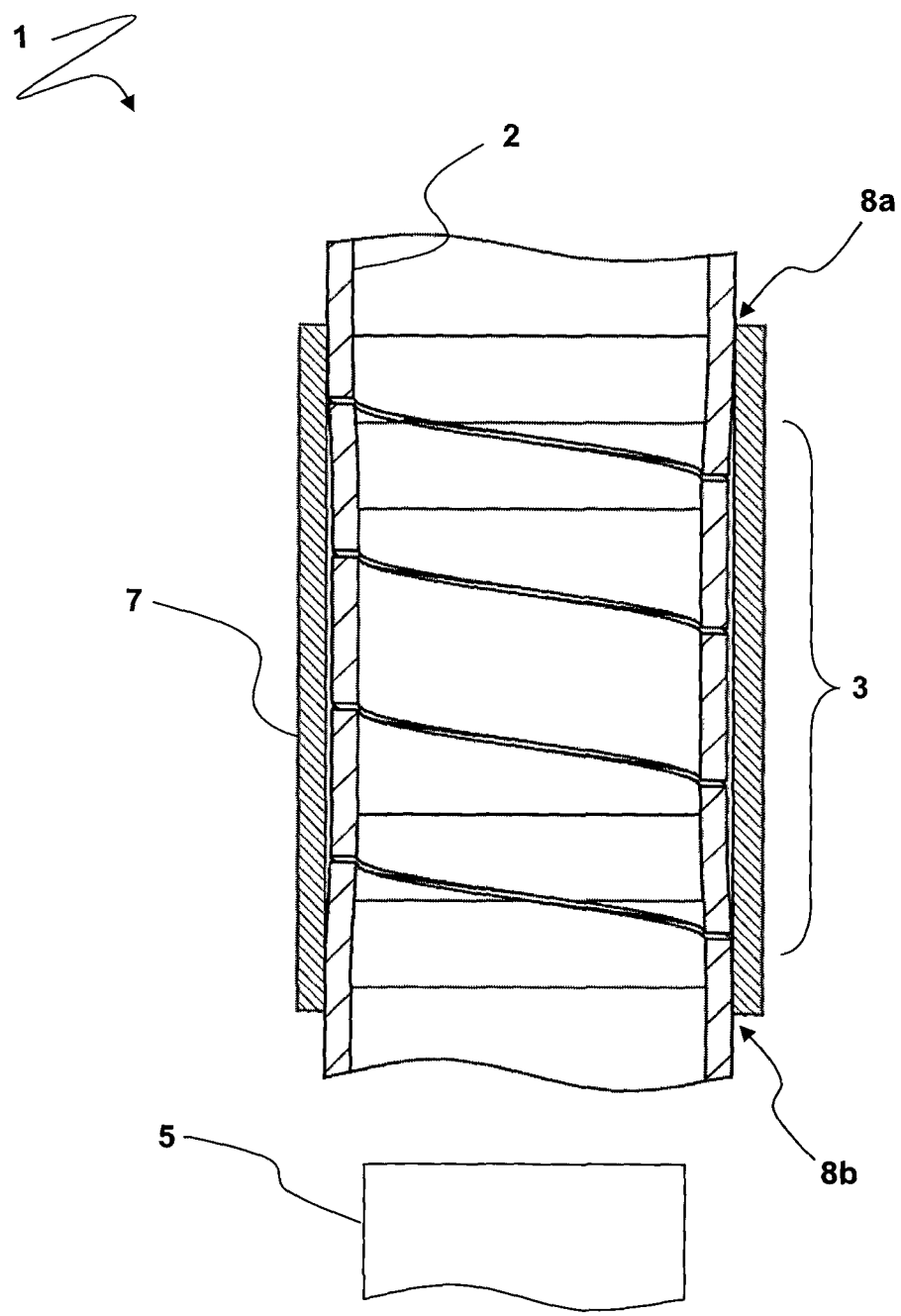

FIG. 1C illustrates a further embodiment, in which the cover 6 of FIG. 1B is replaced with a sleeve 7. The sleeve 7 extends over the spring 3, and is secured to the shaft 2 using a layer of double sided adhesive tape (not shown) between the sleeve 7 and spring 3.

The sleeve 7 is made of a resilient foam, which being adhered to the spring limits both radial and longitudinal expansion of the spring.

In addition to securing the sleeve 7 in place, this also seals the spring 3 to prevent foreign matter entering the shaft 2 via the spring 3.

Figure 2A:
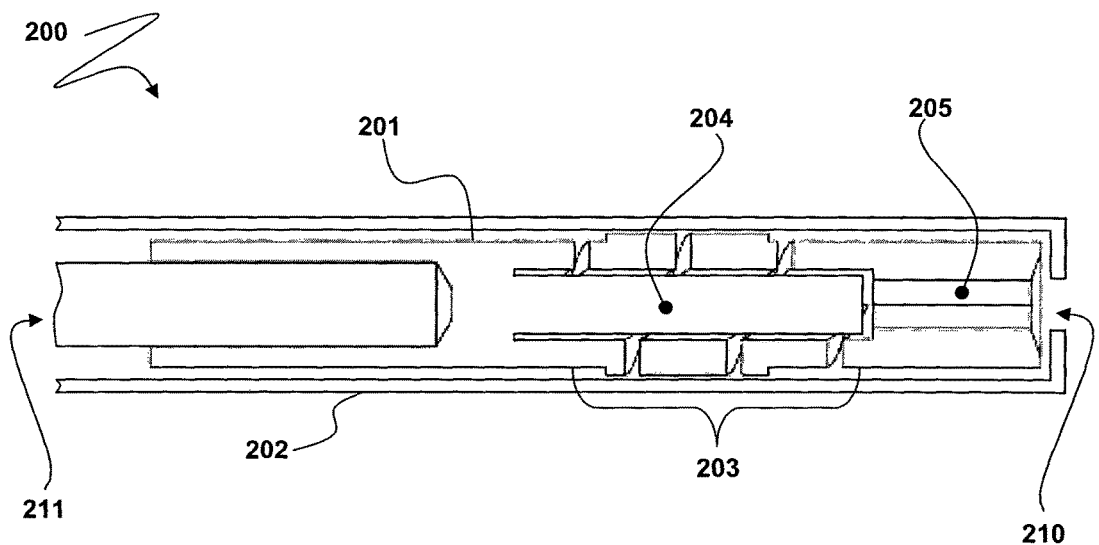
FIGS. 2A and 2B is a cross-sectional view of an exemplary connector system and associated tool in accordance with another embodiment of the present invention.

FIG. 2A illustrates an alternative connector system 200 in which the connector 201 is configured to be received by a hollow shaft 202. The connector 201 includes a spring 203 configured to expand towards a natural state which bears against the interior of the hollow shaft 202.

Figure 2B:
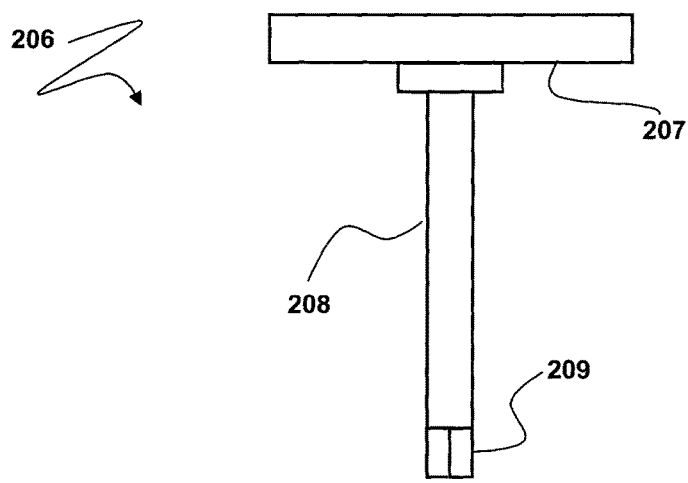

A central shaft 204 is positioned within the spring 203, and prevents contraction of the spring 203 beyond a desired extent. Control of the spring 203 may be achieved using hexagonal slot 205 and tool 206. In FIG. 2B it may be seen that the tool 206 includes a handle 207, tool shaft 208, and hexagonal bit 209 configured to engage with the slot 205.

The tool 206 may be inserted through aperture 210 in the hollow shaft 202, and twisted while holding secondary shaft 211 (secured to the connector 201) in order to contract the spring 203 so the shafts 202 and 211 can be adjusted relative to each other.

Figure 3:
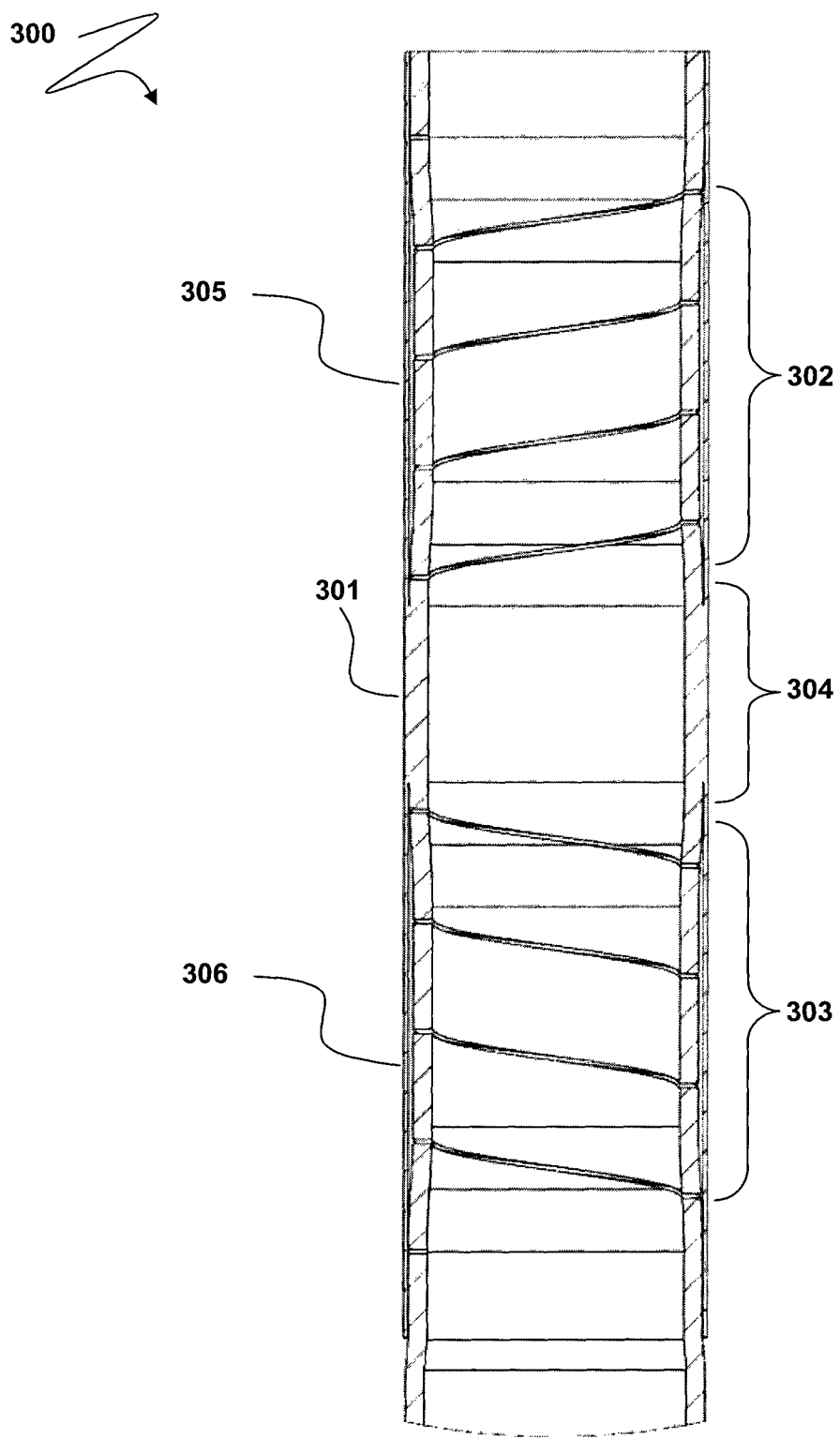
FIG. 3 is a cross-sectional view of an exemplary connector according to a further embodiment of the present invention.

FIG. 3 illustrates a connector 300 in which the hollow shaft 301 includes a right handed spring 302 and a left handed spring 303 on either side of a central portion 304. Sheaths 305 and 306 are generally configured in the manner of sheath 4 of FIG. 1A, restricting expansion of the springs 302 and 303.

In operation, the connector 300 may be pulled onto a shaft (not illustrated), applying a linear and/or rotational force to the springs 302 and 303, tensioning them and increasing their inner diameter in order to allow passage of the shaft.

On removal of the force, the inner diameter of each of the springs 302 and 303 contracts, creating a friction fit between the interior of the connector 300 and the exterior of the shaft.

Once the springs 302 and 303 are positioned on the shaft, pulling the shaft will cause them to contract. This contraction will increase the friction fit between the interior of the springs 302 and 303 and the exterior of the shaft and thus resist movement. Further, holding the shaft and rotating the connector 300 about an end extending beyond sleeve 305 or 306 to release one of the springs will cause the other spring to contract and enhance the locking effect.

It is envisaged that this may be particularly useful where one end of the connector 300 is to be used as, or attached to, a handle—and use of the handle will apply rotational force to the connector 300 despite it being desirable to maintain the current positioning of the connector 300 relative to the shaft.

In order to release both springs 302 and 303, rotational force may be applied to the central portion 304. This simultaneous expansion of the springs 302 and 303 allows the shaft to be withdrawn from the connector 300.

Figure 4A:
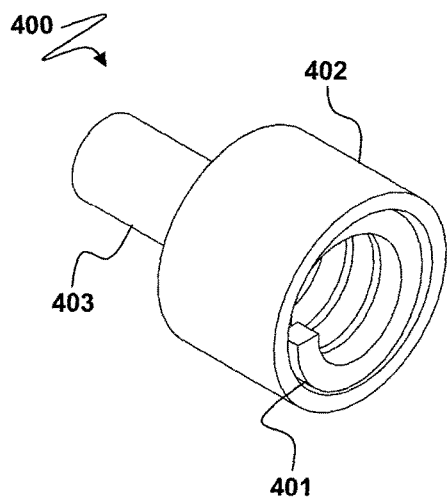
FIG. 4A-4C illustrate an exemplary tool bit according to another embodiment of the present invention.
Figure 4B:
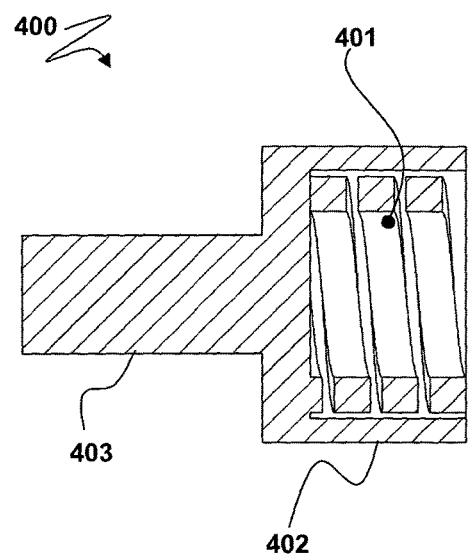

FIGS. 4A and 4B illustrate a fastener driver bit 400 according to another embodiment of the present invention. The bit 400 includes a helical spring 401 contained within a housing 402. A shank 403 may be inserted into and secured by a chuck of a drill (not illustrated) to drive the bit 400.

Figure 4C:
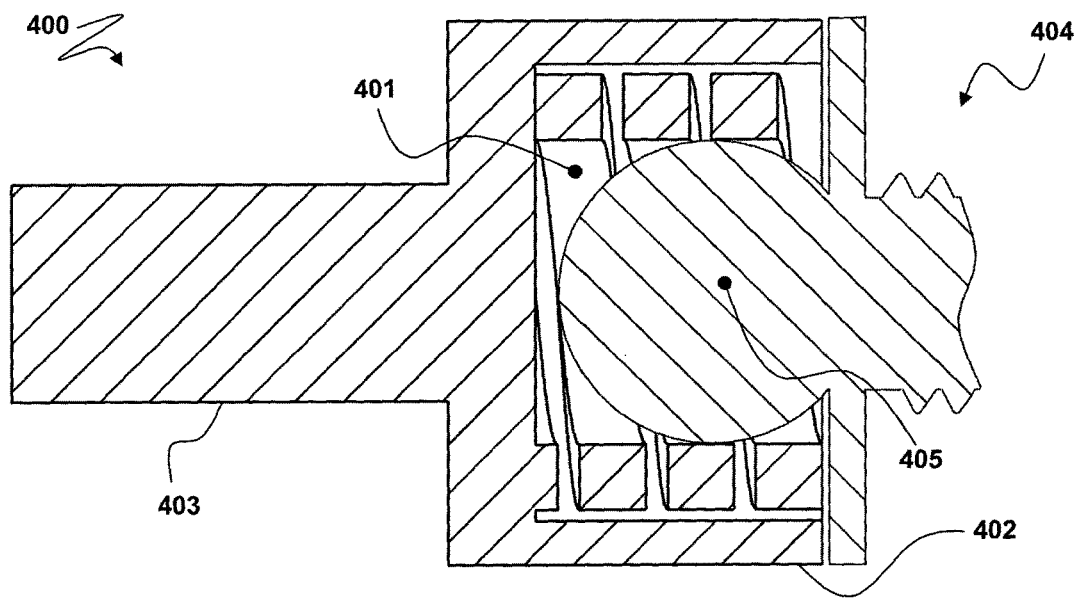

FIG. 4C illustrates the bit 400 in use with a fastener 404 having a spherical or ball head 405. As the bit 400 is rotated clockwise (viewed from a chuck end), the spring 401 tightens and binds on the head 405, and drives the fastener 404. The housing 402 prevents misbehaviour of the spring 501—particularly twisting of the winds of the spring 501 as it tightens on the head 405 Once in place, the bit 400 may be rotated in the opposite position to release the head 405. Another bit (not illustrated) having a counter wound spring may be used to remove the fastener 404.

Figure 5:
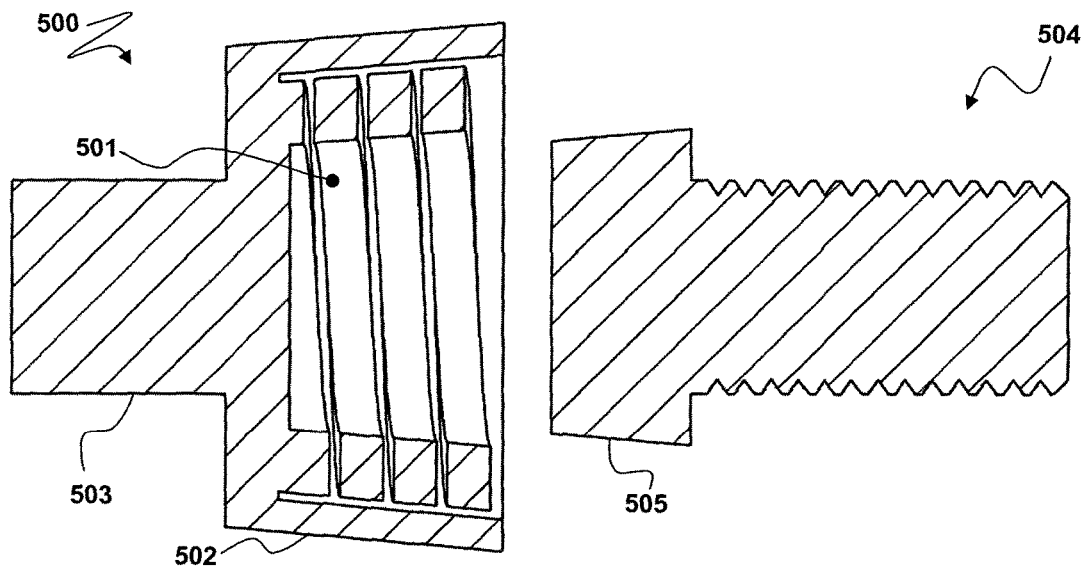
FIG. 5 is a cross-sectional view of an exemplary tool bit according to an embodiment of the present invention.

FIG. 5 illustrates a fastener driver bit 500 generally configured in the same manner as bit 400 of FIG. 4A. The bit 500 includes a spring 501 contained within a housing 502, and may be secured to a driver (not illustrated) using shank 503.

However, in this embodiment, the spring 501 is intended to be used with a fastener 504 having a conical head 505. While the linear spring 401 of FIG. 4A may be capable of tightening on the conical head 505, the effectiveness of the spring 501 is enhanced due to a corresponding tapering of the spring 501 aligning its interior surface with the head 505. It may be seen that housing 502 tapers accordingly to place a consistent limitation on the change in diameter of spring 501 along its length.

Figure 6A:
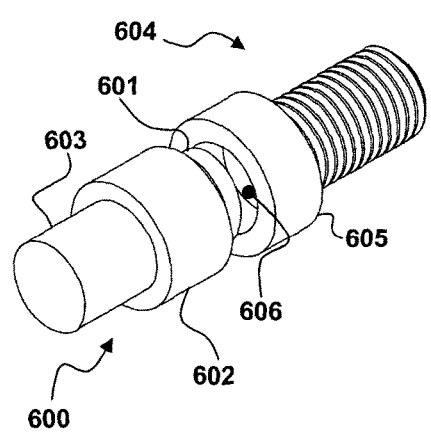
FIGS. 6A & 6B illustrate an exemplary tool bit according to another embodiment of the present invention.
Figure 6B:
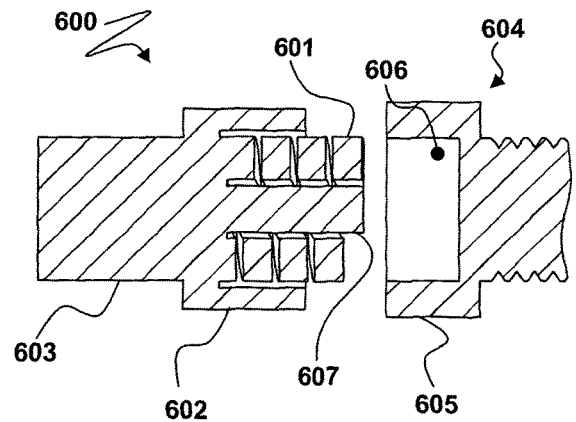

FIGS. 6A and 6B illustrate a fastener driver bit 600 according to a further embodiment of the present invention. The bit 600 includes a helical spring 601 partially contained within a housing 602. A shank 603 may be inserted into and secured by a chuck of a drill (not illustrated) to drive the bit 600.

The fastener bit 600 is for use with a fastener 604, having a head 605 in which a cylindrical recess 606 is located. The exposed portion of the spring 601 is inserted into the recess 606, such that housing 602 meets head 605. Rotation of the bit 600 causes the spring 601 to expand and bind against the recess 606 to drive the fastener 604. A central shaft 607 within the spring 601 restricts the extent to which the spring 601 can contract, or the winds twist.

Figure 7:
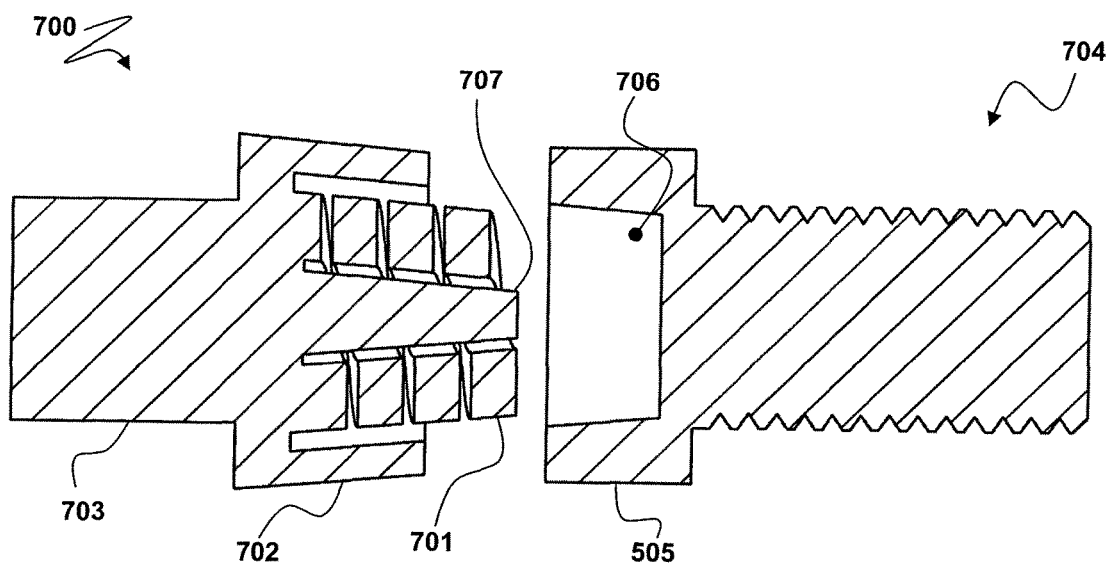
FIG. 7 is a cross-sectional view of an exemplary tool bit according to a further embodiment of the present invention.

FIG. 7 illustrates a fastener driver bit 500 generally configured in the same manner as bit 600 of FIGS. 6A and 6B. The bit 700 bit includes a helical spring 701 partially contained within a housing 702. A shank 703 may be inserted into and secured by a chuck of a drill (not illustrated) to drive the bit 700.

The fastener bit 700 is for use with a fastener 704, having a head 705 in which a conical recess 706 is located. As such, the spring 701, housing 702, and central shaft 707 are tapered to better align the exterior of the spring 701 with the conical recess 706.

In doing so, the housing 702 and central shaft 707 plan a consistent limitation on the change in diameter of the spring 701 along its length. While the housing 702 does not extend the entire length of the spring 701, the exposed portion is contained within conical recess 706 during operation.

Aspects of the present invention have been described by way of example only and it should be appreciated that modifications and additions may be made thereto without departing from the scope thereof.

The invention claimed is:

1. An adjustable length shaft comprising a first hollow shaft portion and an inserted shaft portion and including a connector comprising:
   a spring connection comprising two springs oriented in opposed directions on the first hollow shaft portion;
   each spring configured to change a dimension selected from one of diameter or length or both, in response to a change in force applied to it, wherein the spring is biased in a radial or longitudinal direction towards a natural dimension; and a sleeve overlying said connector and configured to restrict the change in dimension in a direction away from the bias of at least one spring.

2. The shaft of claim 1 wherein at least one spring comprises a helix formed in the shaft portion.

3. The shaft of claim 1 wherein the inserted shaft portion comprises a rod.

4. The shaft of claim 1 wherein the shaft is a component of a paddle.

5. The shaft of claim 1 wherein said force comprises twisting and wherein the sleeve restricts expansion of at least one spring at least one of radially and longitudinally when the force is applied.

6. The shaft of claim 1 further comprising a reinforcement element disposed within at least one spring.

7. The shaft of claim 1 wherein the sleeve surrounds an entire length of the connector.

8. The shaft of claim 1 wherein said sleeve is comprised of a resilient material.

9. The shaft of claim 1 wherein the sleeve further comprises a handle.

10. The shaft of claim 1 wherein an inner diameter of the spring is tapered.

11. The shaft of claim 1 wherein the sleeve is discontinuous.

12. The shaft of claim 1 wherein said inserted shaft portion is hollow.

13. The shaft of claim 1 wherein said sleeve is mechanically secured to at least an end of at least one spring.

14. A mechanism for gripping and adjusting the length of a shaft having an external surface with an outer dimension, said mechanism comprising:
- a sleeve configured to receive the outer dimension of a first portion of the shaft;
- a spring comprising the outer dimension of said first portion of said shaft, said sleeve surrounding at least a portion of an outer surface of said spring;
- the spring having an inner diameter of an at least similar dimension to the outer dimension of a second shaft portion;
- the spring being configured such that when gripping force is applied the first shaft portion can move over the second shaft portion;
- the sleeve positioned such that the gripping force can be applied upon the spring via the sleeve to allow adjustment of the shaft length via at least relative rotation of the shaft portions; and
- when the gripping force is no longer applied the spring is biased to return toward its original inner diameter and bear against the external surface of the second shaft portion.

15. A method of adjusting the length of the shaft of claim 1, comprising the steps of
- gripping the sleeve;
- applying a force to the shaft portions such that a dimension selected from the diameter or length or both of at least one spring deviates from its unacted upon dimension;
- adjusting the relative positions of each shaft portion while gripping the sleeve and applying the force; and
- releasing the force and releasing the gripping of the sleeve, allowing the spring to return towards its unacted upon dimension thereby providing a friction fit between the spring and the inserted shaft portion.

16. The method of claim 15 wherein said force comprises rotation of the first hollow shaft portion relative to the inserted shaft portion.

17. A method of adjusting orientation of the first hollow shaft portion relative to the inserted shaft portion of claim 14, comprising the steps of:
- gripping the sleeve;
- rotating the shaft portions such that a dimension selected from the diameter or length or both of the spring deviates from its unacted upon dimension;
- adjusting the orientation of each shaft portion while gripping the sleeve and rotating the shaft portions relative to one another; and
- releasing the gripping of the sleeve, allowing the spring to return towards its unacted upon dimension thereby providing a friction fit between the spring and the second shaft portion.

* * * * *